US012379288B2

(12) United States Patent
Bevel et al.

(10) Patent No.: US 12,379,288 B2
(45) Date of Patent: Aug. 5, 2025

(54) SYSTEMS AND METHODS FOR TESTING DAMPING MODULES (71) Applicant: GM GLOBAL TECHNOLOGY OPERATIONS LLC, Detroit, MI (US)

(72) Inventors: Gregory Bevel, Fowlerville, MI (US); Scott P. Sherman, Fenton, MI (US); Ian Y. Hwa, West Bloomfield, MI (US); Kevin Huemmer, Pinckney, MI (US); Daniel J. Hrbek, Fenton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 251 days.

(21) Appl. No.: 18/131,741

(22) Filed: Apr. 6, 2023

(65) Prior Publication Data

US 2024/0337565 A1 Oct. 10, 2024

(51) Int. Cl.
*G01M 17/04* (2006.01)
(52) U.S. Cl.
CPC .................................. *G01M 17/04* (2013.01)
(58) Field of Classification Search
CPC ............................ G01M 17/04; G01M 17/007
See application file for complete search history.

(56) References Cited

U.S. PATENT DOCUMENTS

| 5,610,330 | A | * | 3/1997 | Fricke | G01M 17/0074 |
| | | | | | 73/146 |
| 9,889,878 | B2 | | 2/2018 | Konieczny et al. | |
| 10,093,345 | B1 | | 10/2018 | Dickson et al. | |
| 10,489,993 | B2 | | 11/2019 | Dan et al. | |
| 2008/0250844 | A1 | * | 10/2008 | Gartner | G01M 17/04 |
| | | | | | 73/11.07 |
| 2022/0187168 | A1 | | 6/2022 | Dan et al. | |
| 2022/0410964 | A1 | | 12/2022 | Versical et al. | |

FOREIGN PATENT DOCUMENTS

CN        111832122 A  * 10/2020

* cited by examiner

*Primary Examiner* — Timothy P Graves (57) ABSTRACT

A system for testing a damping module includes a test machine configured to test a damping module, and a control module in communication with the test machine. The control module is configured to create an engineered input based on vehicle data, activate the test machine to test the damping module, provide the created engineered input to the test machine to simulate the vehicle data on the damping module while the test machine is testing the damping module, and receive, from the test machine, an output response of the damping module based on the engineered input. Other examples systems and methods for testing a damping module are also disclosed.

20 Claims, 5 Drawing Sheets

SYSTEMS AND METHODS FOR TESTING DAMPING MODULES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for testing damping modules.

A vehicle includes a suspension system having multiple damping modules such as shocks and/or struts for keeping the vehicle's tires in contact with the ground while the vehicle is moving. Such damping modules may be tested. In conventional testing approaches, damping modules are tested during vehicle rides by engineers in the vehicles. In such approaches, the engineers provide comment about the handling of the vehicles, and suppliers tune the damping modules based on the engineers' comments to either increase or decrease damping.

SUMMARY

A system is disclosed for testing a damping module. The system includes a test machine configured to test a damping module, and a control module in communication with the test machine. The control module is configured to create an engineered input based on vehicle data, activate the test machine to test the damping module, provide the created engineered input to the test machine to simulate the vehicle data on the damping module while the test machine is testing the damping module, and receive, from the test machine, an output response of the damping module based on the engineered input.

In other features, the control module is configured to determine whether the output response of the damping module exceeds a defined threshold, in response to the output response of the damping module exceeding the defined threshold, generate a signal to adjust a parameter of the damping module, and activate the test machine to retest the damping module with the adjusted parameter.

In other features, the control module is configured to determine whether the output response of the damping module exceeds a defined threshold, and in response to the output response of the damping module not exceeding the defined threshold, generate a signal indicating a success of the test.

In other features, the damping module includes a strut module or a shock module.

In other features, the vehicle data includes on raw vehicle data measured from a moving vehicle.

In other features, the raw vehicle data measured from the moving vehicle includes at least one of a measured force value of a damping module in the moving vehicle, a measured displacement value of the damping module in the moving vehicle, and a measured acceleration value of the damping module in the moving vehicle.

In other features, the output response includes a waveform of at least one of a measured force value of the damping module in the test machine, a measured displacement value of the damping module in the test machine, and a measured acceleration value of the damping module in the test machine.

In other features, the engineered input includes a waveform representing the measured vehicle data.

In other features, the waveform of the engineered input includes a Ricker waveform.

In other features, the output response includes a waveform, and the control module is configured to determine a difference between the waveform of the output response and the waveform of the engineered input provided to the test machine and in response to the difference between the waveform of the output response and the waveform of the engineered input exceeding a defined threshold, generate a signal to adjust a parameter of the damping module.

A method is disclosed for testing a damping module. The method includes creating an engineered input based on vehicle data, activating a test machine including a damping module to test the damping module, providing the created engineered input to the test machine to simulate the vehicle data on the damping module while the test machine is testing the damping module, and receiving, from the test machine, an output response of the damping module based on the engineered input.

In other features, the method includes determining whether the output response of the damping module exceeds a defined threshold, in response to the output response of the damping module exceeding the defined threshold, generating a signal to adjust a parameter of the damping module, and activating the test machine to retest the damping module with the adjusted parameter.

In other features, the method includes determining whether the output response of the damping module exceeds a defined threshold, and in response to the output response of the damping module not exceeding the defined threshold, generating a signal indicating a success of the test.

In other features, the damping module includes a strut module or a shock module.

In other features, the vehicle data includes on raw vehicle data measured from a moving vehicle.

In other features, the method includes generating the raw vehicle data from the moving vehicle by at least one of measuring a force value of a damping module in the moving vehicle, measuring a displacement value of the damping module in the moving vehicle, and measuring an acceleration value of the damping module in the moving vehicle.

In other features, the output response includes a waveform of at least one of a measured force value of the damping module in the test machine, a measured displacement value of the damping module in the test machine, and a measured acceleration value of the damping module in the test machine.

In other features, the engineered input includes a waveform representing the vehicle data, the output response includes a waveform, and the method further includes determining a difference between the waveform of the output response and the waveform of the engineered input provided to the test machine and in response to the difference between the waveform of the output response and the waveform of the engineered input exceeding a defined threshold, generating a signal to adjust a parameter of the damping module.

In other features, the waveform of the engineered input includes a Ricker waveform.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle includes a suspension system having multiple damping modules. Conventionally, the damping modules are tested during vehicle rides. Specifically, an engineer riding in the vehicle provides comments about vehicle handling and then suppliers tune the damping modules based on the comments to either increase or decrease damping. Additionally, in some instances, the damping modules may be externally tested apart from the vehicles to generate resulting force versus velocity curves. However, conventional testing methods of damping modules are based on subjective comments from engineers riding in the vehicles and/or subjective evaluations of generated curves. Such subjective comments and evaluations can vary from engineer to engineer. Additionally, it is possible for multiple damping modules with different valving to produce the same force versus velocity curves, but feel subjectively different in the vehicle (e.g., during vehicle ride tests).

The testing systems and methods according to the present disclosure provide accurate and objective testing of damping modules by applying engineered inputs to evaluate the damping modules and then tuning the damping modules in a lab using objective data and established performance metrics. For example, the testing systems and methods herein create an objective, engineered input based on vehicle data (e.g., raw vehicle data measured from a moving vehicle, simulated vehicle data, etc.), utilize the created engineered input in a test machine for testing a damping module to simulate the vehicle data on the damping module while the test machine is testing the damping module, and then receive an output response of the damping module based on the engineered input. The testing systems and methods then may compare the output response of the damping module against established performance metric. In this manner, the testing systems and methods of the present disclosure utilize a bench test methodology and developed objective metrics to establish pass/fail criteria for evaluating damping modules (including their components such as shocks, struts, springs, mounts, etc.) and tuning of the damping modules.

By testing damping modules as described herein, the evaluation and tuning of the damping modules may be completed earlier in program development without the need of vehicles. As such, the time and cost required to tune the damping modules may be reduced as compared to conventional procedures by not requiring repeated installation and removal of the damping modules from vehicles each time the damping modules are adjusted. Additionally, by relying on objective metrics and standard engineered inputs, performance of the tested damping modules is more consistent as compared to damping modules evaluated based on subjective data.

Figure 1:
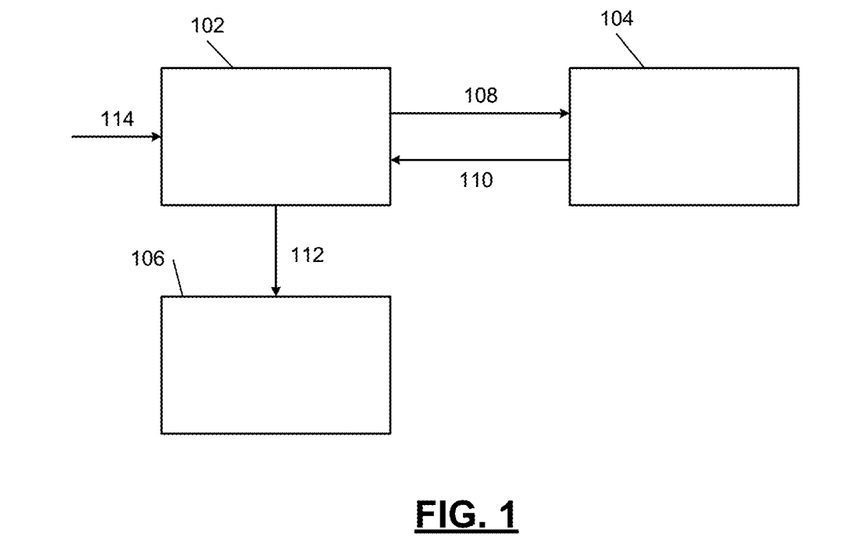
FIG. 1 is a block diagram of an example system for testing a damping module according to the present disclosure.

Referring now to FIG. 1, a block diagram of an example system 100 for testing a damping module is presented. As shown in FIG. 1, the system 100 generally includes a control module 102 and a test machine 104 in communication with the control module 102. For example, and as further explained below, the test machine 104 receives engineered inputs via one or more input signals 108 from the control module 102 and transmits output responses of the damping module via one or more output signals 110 to the control module 102. The system 100 may further include an optional display module 106 in communication with the control module 102. In such examples, the display module 106 may receive results (e.g., pass, fail, etc.) of tests, processed output responses, etc. via one or more input signals 112, and then display the results, the output responses, etc.

Figure 2:
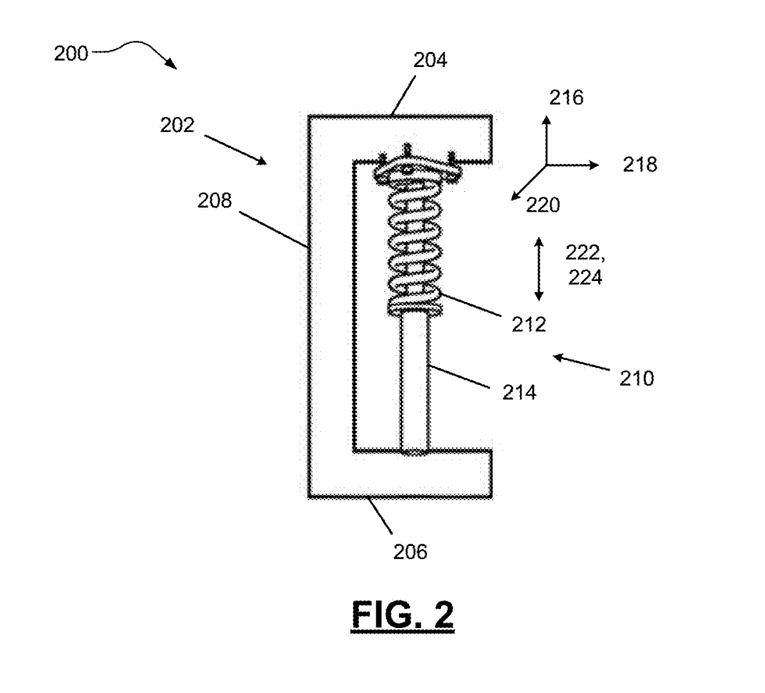
FIG. 2 is a block diagram of an example test machine employable in the system of FIG. 1 according to the present disclosure.

In the example of FIG. 1, the test machine 104 includes a damping module mounted therein and performs tests on the damping module on received engineered inputs. FIG. 2 illustrates one example of a test machine 200 employable in the system 100 of FIG. 1. Although the test machine 200 of FIG. 2 is shown and described as having particular components and a particular damping module mounted therein, it should be appreciated that any suitable test machine may be implemented with any suitable damping module mounted therein.

As shown in FIG. 2, the test machine 200 generally includes a frame 202 having bases 204, 206 and a support 208 extending between the bases 204, 206. A damping module 210 is mounted in the test machine 200. Specifically, the damping module 210 is mounted (e.g., via one more fastening devices) to the bases 204, 206 and extends generally parallel to the support 208. When placed in a vehicle, the damping module 210 forms a part of a suspension system in the vehicle.

In the example of FIG. 2, the damping module 210 is depicted as a strut module (or assembly). In this example, the strut module generally includes a damping device (e.g., a spring) 212, a rod 214 extending within the damping device, and one or more mounts. While the damping module 210 of FIG. 2 is shown and described as a strut module, it should be appreciated that other suitable damping modules may be mounted in the test machine 200 for testing. For example, the test machine 200 may have a shock module mounted therein. In such examples, the shock module may include a tube having fluid (e.g., hydraulic fluid, etc.) and a piston in communication with the fluid.

Referring back to FIG. 1, the control module 102 creates one or more engineered inputs based on vehicle data, such as raw vehicle data that is measured from a moving vehicle having a damping module, simulated vehicle data collected from a simulation model, etc. For example, a vehicle may move (e.g., manually driven, controlled, etc.) along a defined path on a road. In doing so, the vehicle may be forced to encounter one or more obstacles (e.g., frost heave events, bumps, potholes, and/or other impediments on the road). When the vehicle hits the obstacles, data of the reacting damping module may be measured or otherwise collected. In other examples, a simulation may be performed for a particular vehicle having defined characteristics (e.g., a selected damping module, etc.) and encountering one or more selected obstacles. Simulated vehicle data may then be collected (e.g., based on the selected damping module, obstacles, etc.) and used to create an engineered input. In such examples, the raw vehicle data and/or simulated vehicle data may be in the form of a sinusoidal wave, a triangle wave, a square wave, etc.

Figure 3:
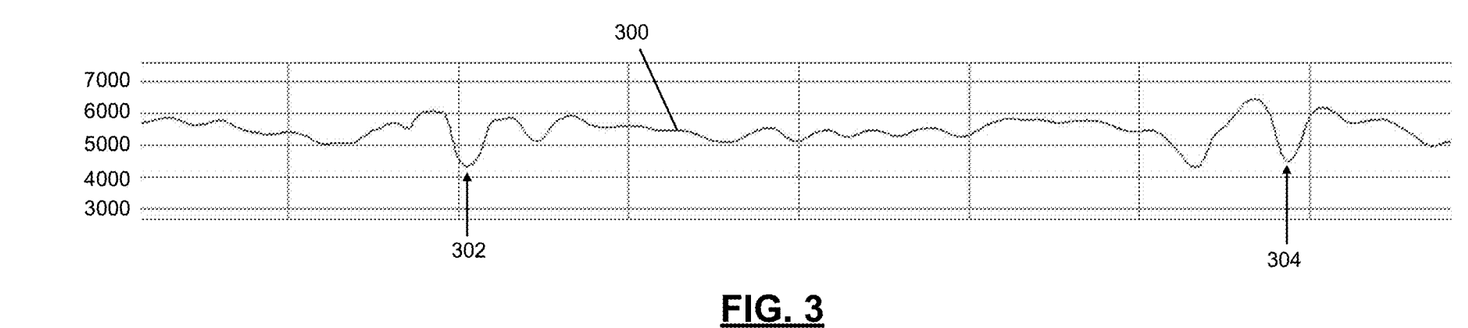
FIG. 3 is a graph depicting a waveform of collected raw vehicle data of a vehicle hitting a frost heave event on a road according to the present disclosure.

For example, FIG. 3 depicts a waveform 300 of collected raw vehicle data of a vehicle hitting a frost heave event on a road. In FIG. 3, the collected raw vehicle data represents force (N) values associated with a damping module in the vehicle over time. In this example, the force (N) values are vertical force components at the top of the damping module. As shown, the collected force values form Ricker waves, as indicated by arrows 302, 304, when the vehicle hits the frost heave event on the road. The collected force values (e.g., raw vehicle data) may then be provided to the control module 102 (e.g., via one or more input signals 114) and used by the control module 102 to create an engineered input simulating a vehicle hitting a frost heave event. For example, the waveform 300 of FIG. 3 may be engineered at one or more set frequencies (e.g., 10 Hz, 11 Hz, 12 Hz, 13 Hz, 14 Hz, 15 Hz, etc.) to recreate the frost heave event.

Figure 4:
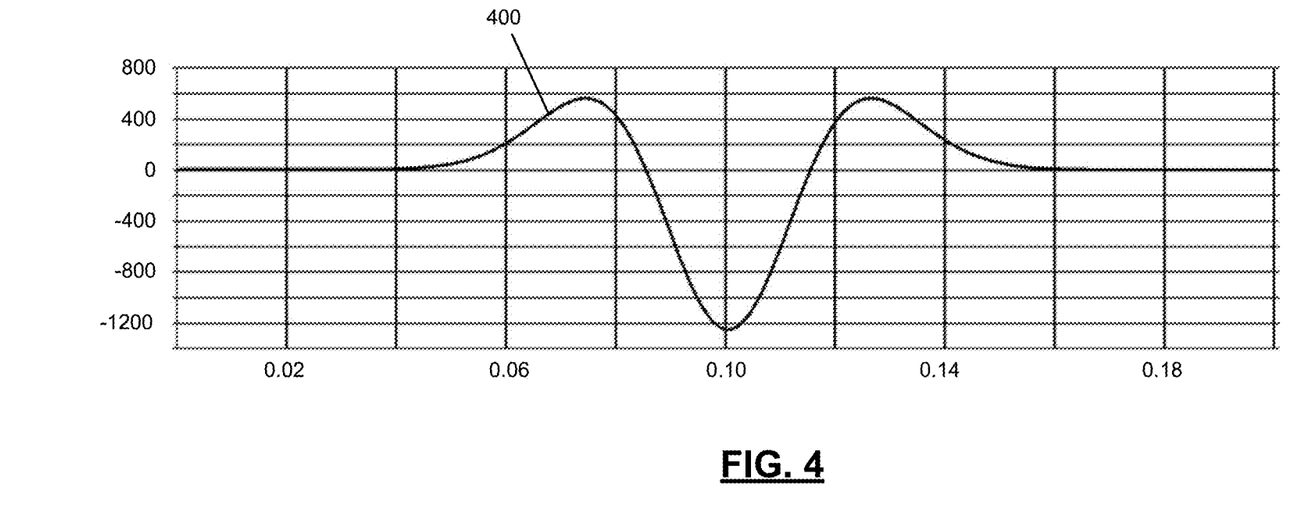
FIG. 4 is a graph depicting a waveform of an engineered input based on the waveform of FIG. 3 according to the present disclosure.

FIG. 4 depicts a waveform 400 of an engineered input representing a portion of the collected force values of the waveform 300 of FIG. 3. As shown in FIG. 4, the engineered input waveform 400 includes force (N) values over time, and is in the form of a Ricker wave which mimics one of the Ricker waves in the waveform 300. The engineered input waveform 400 may then be provided to the test machine 104 of FIG. 1.

Although the waveforms 300, 400 of FIGS. 3-4 are shown and described as vertical force values at the top of a damping module, it should be appreciated that the vehicle data and/or engineered inputs may represent other suitable data. For example, the vehicle data (e.g., raw vehicle data, simulated vehicle data, etc.) may represent vertical force values at the bottom of the damping module, force values in other directions (e.g., different horizontal directions) at the top or bottom of the damping module, a displacement value (e.g., vertical movement of a shock piston, a strut rod, etc.) of the damping module, an acceleration value of the damping module, etc. In connection therewith, engineered inputs representing such raw data may be created in a similar manner as explained above.

Figure 5:
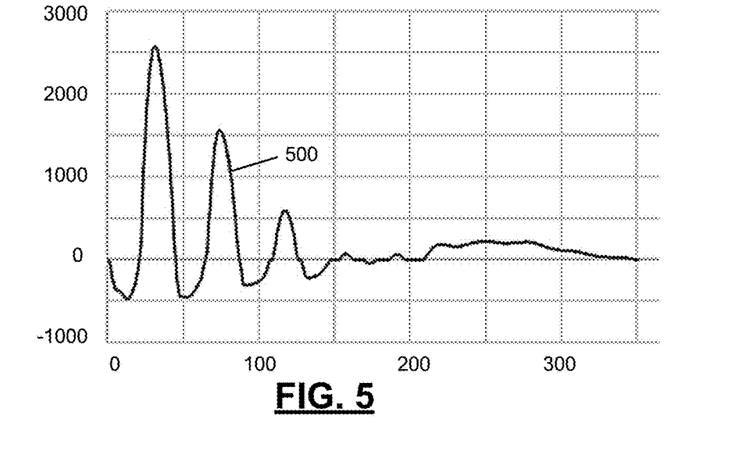
FIGS. 5-7 are graphs depicting example waveforms of other engineered inputs according to the present disclosure.
Figure 6:
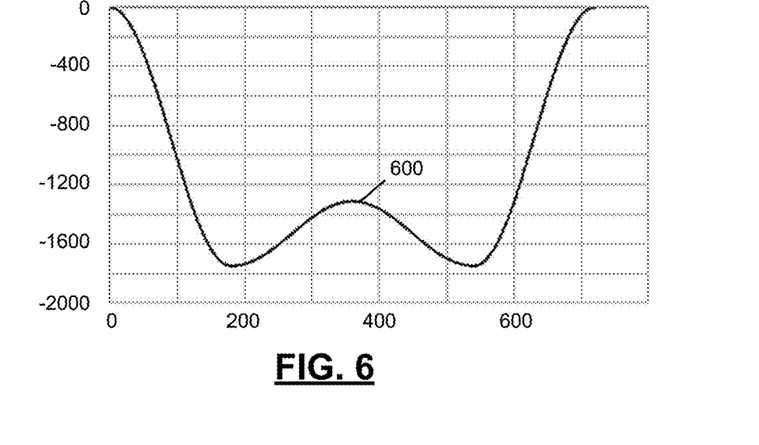
Figure 7:
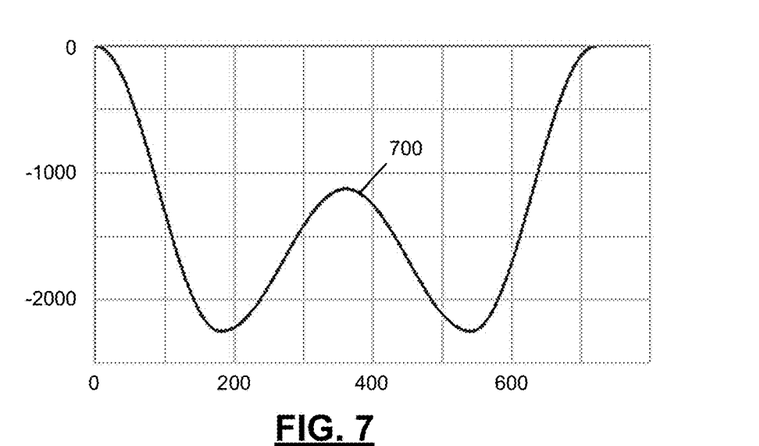

Additionally, although the waveforms 300, 400 of FIGS. 3-4 are shown and described as forming Ricker waves, it should be appreciated that other waveforms may be employed depending on, for example, the movement of the vehicle, its interactions with and/or avoidance of obstacles, etc. For example, FIGS. 5-7 depict various example waveforms 500, 600, 700 of engineered inputs including force (N) values over time. In such examples, the engineered inputs represent collected force values (e.g., vehicle data) of a damping module in a moving vehicle. For instance, the waveform 500 represents an engineered input based on a vehicle (e.g., an actual vehicle, a simulated vehicle, etc.) encountering a bump, and the waveforms 600, 700 represent engineered inputs based on a vehicle (e.g., an actual vehicle, a simulated vehicle, etc.) moving along a defined road.

Referring back to FIG. 1, the control module 102 may activate the test machine 104 to test the damping module therein. For example, the control module 102 may transmit an enable or activation signal to the test machine 104 as one of the input signals 108. In response to receiving the signal, the test machine 104 may initiate testing of the damping module. In various embodiments, the test machine 104 may test the damping module to record bench values (e.g., force, acceleration, displacement, etc.) associated with the damping module prior to testing the damping module based on the created engineered input, as further explained below.

Additionally, the control module 102 may transmit the created engineered input (e.g., the waveform 400 of FIG. 4) to the test machine 104 to simulate the vehicle data (e.g., the waveform 300 of FIG. 3) on the damping module. The engineered input may be provided via one of the input signals 108. In various examples, the engineered input may be provided at the same time as or a different time (e.g., before or after) than the enable signal referenced above.

In response to the engineered input, the test machine 104 (and/or the control module 102) may manipulate one or more actuators in the test machine 104 to cause movement of one or more components of the test machine 104, thereby simulating the vehicle data on the damping module while the test machine 104 is testing the damping module. For example, the test machine 104 (and/or the control module 102) may generate one or more control signals for the actuator(s) based on the engineered input. In response, the actuator(s) cause movement of the base 204, the base 206, the support 208, and/or one or more others fixtures of the test machine 104. In some examples, such fixtures may include multiple arms coupled between the damping module and the base 206, multiple arms coupled between the damping module and the base 204, etc.

The control module 102 may then receive an output response of the damping module based on the engineered input. For instance, the control module 102 may receive the output response from the test machine 104 via one of the output signals 110. The control module 102 may then store data corresponding to the received the output response if desired.

Figure 8:
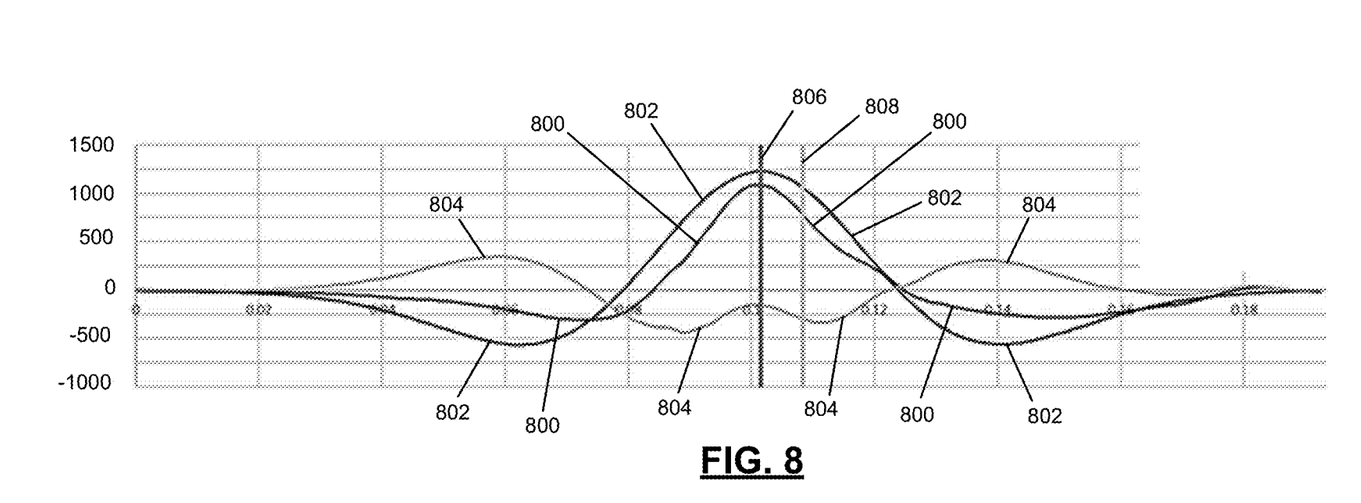
FIGS. 8-9 are graphs depicting waveforms including example output response waveforms according to the present disclosure.
Figure 9:
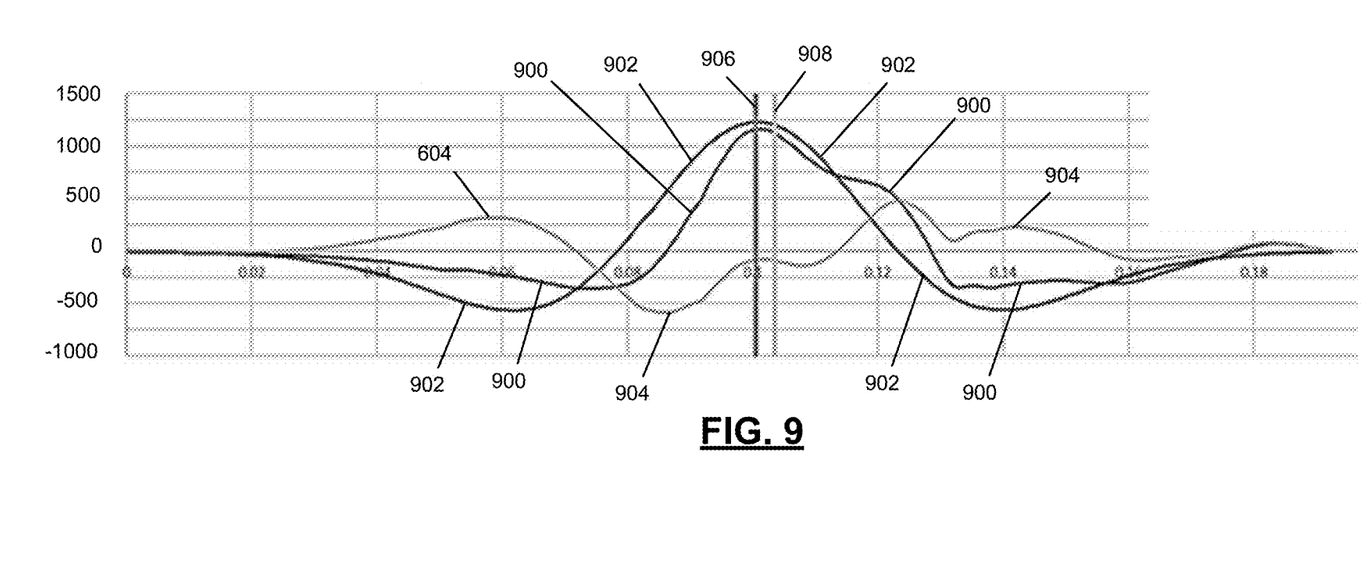

In various embodiments, the control module 102 may process data of the output response to create an output waveform. For example, FIGS. 8-9 depict graphs of multiple waveforms, including output waveforms 800, 900, respectively. In the example of FIGS. 8-9, the output response waveforms 800, 900 represent force (N) values over time. For instance, the force (N) values of the output response waveforms 800, 900 may be vertical force components at the top of the tested damping module 210 of FIG. 2. This vertical force component is shown by arrow 216 in FIG. 2.

Although the output waveforms 800, 900 of FIGS. 8-9 are shown and described as vertical force values at the top of the damping module (e.g., the damping module 210), it should be appreciated that the output response may represent other suitable data. For example, the received output response may be vertical force values at the bottom of the damping module, force values in other directions (e.g., different horizontal directions as shown by arrows 218, 220 in FIG. 2) at the top or bottom of the damping module, a displacement value (e.g., vertical movement of a shock piston, a strut rod, etc. as shown by arrow 222 in FIG. 2) of the damping module, an acceleration value of the damping module (as shown by arrow 224 in FIG. 2), etc. In such examples, the control module 102 may process data of the received output response to create appropriate output waveforms (e.g., force, displacement, acceleration, etc. versus time).

In various embodiments, the control module 102 may evaluate the output response waveform (e.g., the waveforms 800, 900) to determine whether tuning of the damping module is needed. For example, the control module 102 may determine whether the output response of the damping module exceeds a defined threshold. In such examples, the control module 102 may compare the output response to the defined threshold, compare a difference between the output response and the engineering input to the defined threshold, etc. If the output response of the damping module falls within the defined threshold, the control module 102 may generate a signal indicating a success of the test. In such examples, the control module 102 may transmit the signal as one of the input signals 112 to the display module 106. In response, the display module 106 may display a notification indicating the test passed.

Alternatively, in response to the output response of the damping module exceeding the defined threshold, the control module 102 may generate a signal to adjust a parameter of the damping module. In such examples, the control module 102 may transmit the signal as one of the input signals 112 to the display module 106. In response, the display module 106 may display a notification indicating the test failed. A user may then adjust a parameter of the damping module. For instance, dampening can be adjusted by adjusting valving, adjusting top and/or bottom mount stiffness, etc.

Then, the damping module with the adjusted parameter may be retested. For example, after adjustment of one or more parameters of the damping module, the control module 102 may activate the test machine 104 to retest the damping module based on the engineered input in a similar manner as explained above. This process of testing the damping module, evaluating the output response, adjusting the damping module (if necessary), and retesting the damping module may be repeated until desired results are achieved.

In various embodiments, the control module 102 may determine success or failure of a test based on a difference between the output response and the engineering input. For example, the graphs of FIGS. 8-9 show example scenarios of a successful test and a failed test, respectively. In FIG. 8, the graph depicts an engineered input waveform 802, the output response waveform 800 phase shifted to align the waveforms 800, 802 (e.g., at peak values of the respective Ricker waves), a line 806 representing the peak of the engineered input waveform 802, and a line 808 representing the peak of the response waveform 800 (before the waveform is phase shifted). In FIG. 9, the graph depicts an engineered input waveform 902, the output response waveform 900 phase shifted to align the waveforms 900, 902, a line 906 representing the peak of the engineered input waveform 902, and a line 908 representing the peak of the response waveform 900 (before the waveform is phase shifted). In various embodiments, the display module 106 of FIG. 1 may display the graphs of FIGS. 8-9 if desired.

The control module 102 of FIG. 1 may determine a difference between the output response waveform and the engineered input waveform provided to the test machine 104. For example, the graph of FIG. 8 includes a waveform 804 representing a difference between the waveforms 800, 802 (e.g., as determined by the control module 102), and the graph of FIG. 9 includes a waveform 904 representing a difference between the waveforms 900, 902 (e.g., as determined by the control module 102). In response to the difference (e.g., the waveform 804 of FIG. 8, the waveform 904 of FIG. 9, etc.) between the output response waveform and the engineered input waveform exceeding a defined threshold, the control module 102 may generate a signal to adjust a parameter of the damping module as explained above. Alternatively, if the difference falls within the defined threshold, the control module 102 may generate a signal indicating a success of the test as explained above.

The defined threshold may be based on any suitable parameter of the determined difference. For example, the defined threshold may be based on a slope (e.g., a rate of change) of the waveform 804 of FIG. 8 or the waveform 904 of FIG. 9. In such examples, the defined threshold may be any suitable percent value, such a value ranging between 5% and 25%, a percentage less than 5%, a percentage greater than 25%, etc. In other examples, the defined threshold may be based on an amplitude of the waveform 804 of FIG. 8 or the waveform 904 of FIG. 9. For example, the defined threshold may be 300 N, 400 N, etc. if the difference waveform (e.g., the waveform 804 of FIG. 8, the waveform 904 of FIG. 9, etc.) represents force values.

Figure 10:
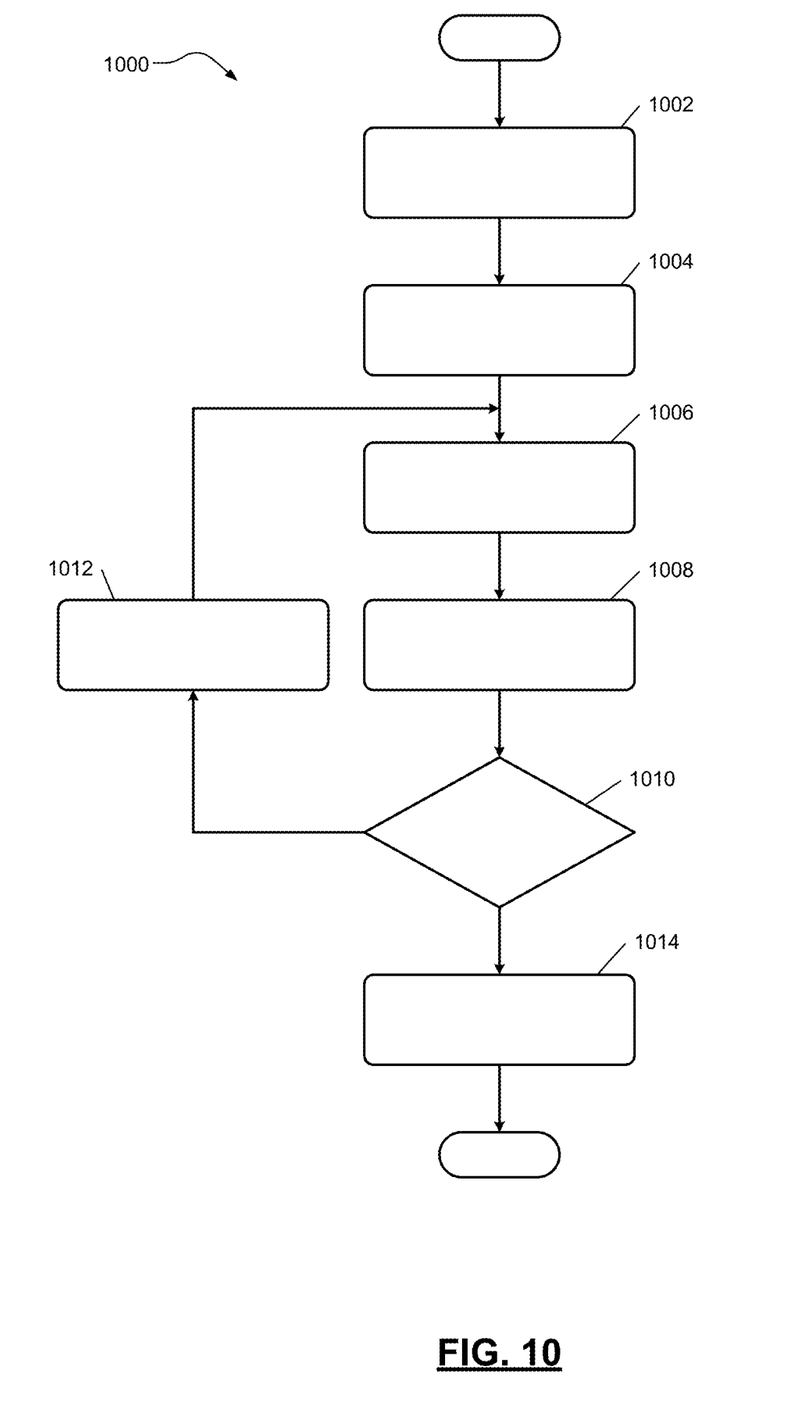
FIG. 10 is a flowchart of a control process for testing a damping module according to the present disclosure.

FIG. 10 illustrates an example control process 1000 employable by the system 100 of FIG. 1 for testing a damping module in the test machine 104. Although the example control process 1000 is described in relation to the system of FIG. 1, including the control module 102 and the test machine 104, the control process 1000 may be employable by any suitable system, control module, and/or test machine. The control process 1000 may start when the system is powered-on and/or at another suitable time.

As shown in FIG. 10, control begins at 1002 where the control module 102 creates an engineered input based on vehicle data, as explained herein. Control then proceeds to 1004 where the control module 102 transmits (or otherwise provides) the created engineered input to the test machine 104. Control then proceeds to 1006. At 1006, the control module 102 transmits a signal (e.g., an enable signal) to activate the test machine 104 to test a damping module therein. In various embodiments, the control module 102 may transmit the signal to activate the test machine 104 before providing the created engineered input to the test machine 104 if desired.

Control then proceeds to 1008 where the control module 102 receives an output response of the damping module from the test machine 104 based on the engineered input, as explained herein. Control then proceeds to 1010.

At 1010, the control module 102 determines whether the received output response exceeds a defined threshold. For example, the control module 102 may compare the output response to the defined threshold, compare a difference between the output response and the engineering input to the defined threshold, etc. If yes at 1010, control proceeds to 1012. Otherwise, control proceeds to 1014.

At 1012, the control module 102 generates a signal (e.g., a failure signal) indicating a failure of the test and adjustment of the damping module is needed. In such examples, the display module 106 may display a notification indicating the test failed. A user may then adjust a parameter of the damping module, as explained herein. Control then returns to 1006 where the control module 102 may activate the test machine 104 again to retest the damping module with the adjusted parameter.

At 1014, the control module 102 generates a signal indicating a success of the test. In such examples, the display module 106 may display a notification indicating the test passed. Control then ends.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for testing a damping module, the system comprising:
   a test machine configured to test a damping module, the test machine including a frame configured to receive the damping module; and
   a controller in communication with the test machine, the controller configured to:
      create an engineered input based on raw vehicle data measured from a moving vehicle, the engineered input including a waveform representing the raw vehicle data, the raw vehicle data including at least one of a measured force value of a damping module in the moving vehicle, a measured displacement value of the damping module in the moving vehicle, and a measured acceleration value of the damping module in the moving vehicle;
      activate the test machine to test the damping module;
      provide the created engineered input to the test machine to simulate the raw vehicle data on the damping module while the test machine is testing the damping module;
      receive, from the test machine, an output response of the damping module based on the engineered input, the output response including a waveform;
      determine a difference between the waveform of the output response and the waveform of the engineered input provided to the test machine; and
      in response to the difference between the waveform of the output response and the waveform of the engineered input exceeding a defined threshold, generate a signal to adjust a parameter of the damping module.

2. The system of claim 1, wherein the controller is configured to:
   determine whether the output response of the damping module exceeds a defined threshold;
   in response to the output response of the damping module exceeding the defined threshold, generate the signal to adjust the parameter of the damping module; and
   activate the test machine to retest the damping module with the adjusted parameter.

3. The system of claim 1, wherein:
   the signal is a first signal; and
   the controller is configured to:
      determine whether the output response of the damping module exceeds a defined threshold; and
      in response to the output response of the damping module not exceeding the defined threshold, generate a second signal indicating a success of the test.

4. The system of claim 1, wherein the damping module includes a strut module or a shock module.

5. The system of claim 1, wherein the output response includes a waveform of at least one of a measured force value of the damping module in the test machine, a measured displacement value of the damping module in the test machine, and a measured acceleration value of the damping module in the test machine.

6. The system of 1, wherein the waveform of the engineered input includes a Ricker waveform.

7. A method for testing a damping module, the method comprising:
   creating an engineered input based on vehicle data, the engineered input including a waveform representing the vehicle data;
   activating a test machine including a frame and a damping module mounted in the frame, to test the damping module;
   providing the created engineered input to the test machine to simulate the vehicle data on the damping module while the test machine is testing the damping module; and
   receiving, from the test machine, an output response of the damping module based on the engineered input, the output response including a waveform;
   determining a difference between the waveform of the output response and the waveform of the engineered input provided to the test machine; and
   in response to the difference between the waveform of the output response and the waveform of the engineered input exceeding a defined threshold, generating a signal to adjust a parameter of the damping module.

8. The method of claim 7, further comprising:
   determining whether the output response of the damping module exceeds a defined threshold;
   in response to the output response of the damping module exceeding the defined threshold, generating the signal to adjust the parameter of the damping module; and
   activating the test machine to retest the damping module with the adjusted parameter.

9. The method of claim 7, wherein:
   the signal is a first signal; and
   the method further comprises:
      determining whether the output response of the damping module exceeds a defined threshold; and
      in response to the output response of the damping module not exceeding the defined threshold, generating a second signal indicating a success of the test.

10. The method of claim 7, wherein the damping module includes a strut module or a shock module.

11. The method of claim 7, wherein the vehicle data includes on raw vehicle data measured from a moving vehicle.

12. The method of claim 11, further comprising generating the raw vehicle data from the moving vehicle by at least one of measuring a force value of a damping module in the moving vehicle, measuring a displacement value of the damping module in the moving vehicle, and measuring an acceleration value of the damping module in the moving vehicle.

13. The method of claim 7, wherein the output response includes a waveform of at least one of a measured force value of the damping module in the test machine, a measured displacement value of the damping module in the test machine, and a measured acceleration value of the damping module in the test machine.

14. The method of claim 11, wherein the waveform of the engineered input includes a Ricker waveform.

15. A system for testing a damping module, the system comprising:
   a test machine configured to test a damping module, the test machine including a frame configured to receive the damping module; and
   a controller in communication with the test machine, the controller configured to:
      create an engineered input based on vehicle data, the engineered input including a waveform representing the vehicle data;
      activate the test machine to test the damping module;

provide the created engineered input to the test machine to simulate the vehicle data on the damping module while the test machine is testing the damping module;

receive, from the test machine, an output response of the damping module based on the engineered input, the output response including a waveform;

determine a difference between the waveform of the output response and the waveform of the engineered input provided to the test machine; and in response to the difference between the waveform of the output response and the waveform of the engineered input exceeding a defined threshold, generate a signal to adjust a parameter of the damping module.

16. The system of claim 15, wherein the controller is configured to:

determine whether the output response of the damping module exceeds a defined threshold;

in response to the output response of the damping module exceeding the defined threshold, generate the signal to adjust the parameter of the damping module; and activate the test machine to retest the damping module with the adjusted parameter.

17. The system of claim 15, wherein:

the signal is a first signal; and the controller is configured to:

determine whether the output response of the damping module exceeds a defined threshold; and in response to the output response of the damping module not exceeding the defined threshold, generate a second signal indicating a success of the test.

18. The system of claim 15, wherein the damping module includes a strut module or a shock module.

19. The system of claim 15, wherein the waveform of the engineered input includes a Ricker waveform.

20. The system of claim 15, wherein the vehicle data includes at least one of a measured force value of a damping module in a moving vehicle, a measured displacement value of the damping module in the moving vehicle, and a measured acceleration value of the damping module in the moving vehicle; and the output response includes a waveform of at least one of a measured force value of the damping module in the test machine, a measured displacement value of the damping module in the test machine, and a measured acceleration value of the damping module in the test machine.

* * * * *